Figure 1:
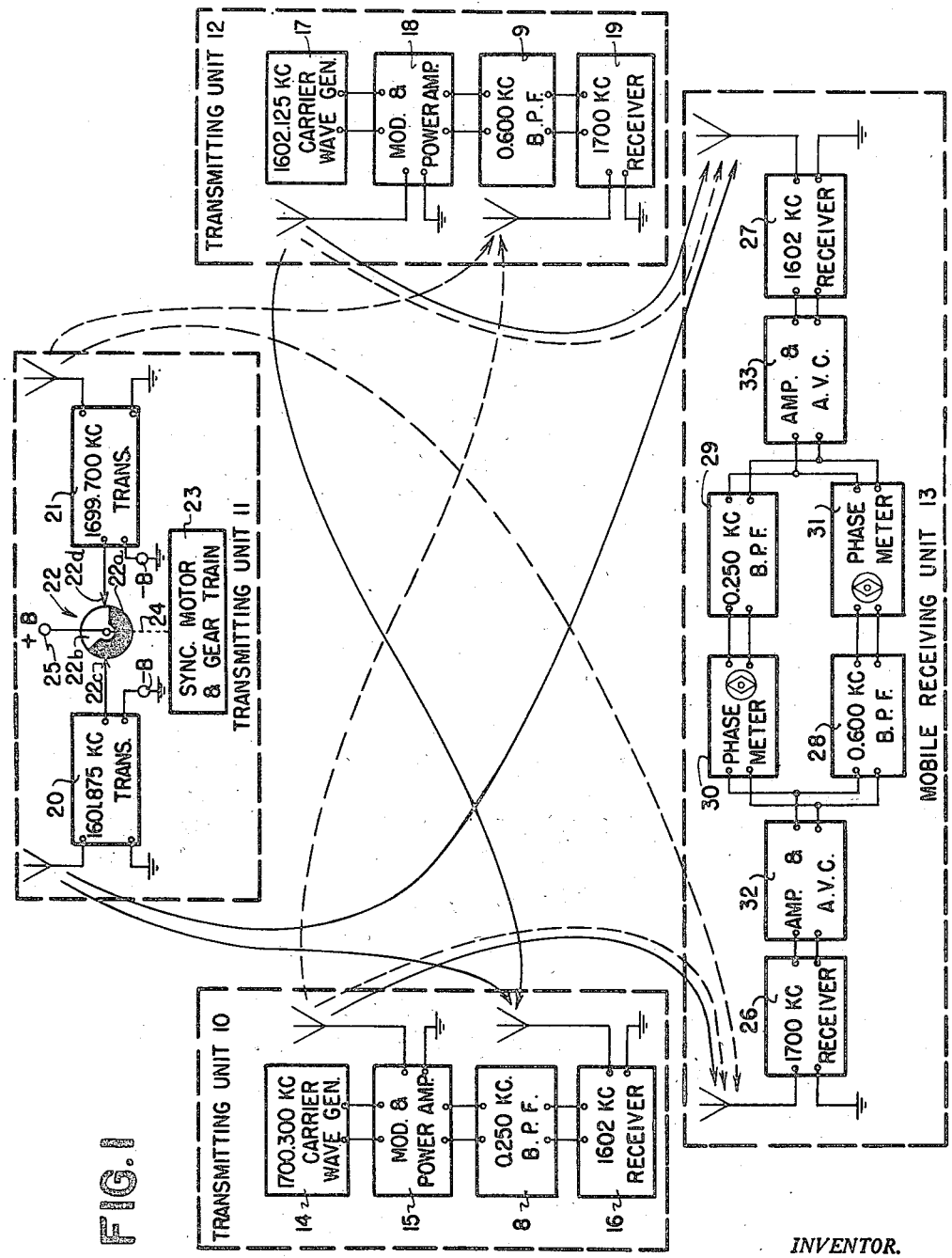

INVENTORS
JAMES E. HAWKINS
BEVERLEY W. KOEPPEL
BY Mason, Kolehmainen, Rathburn and Wyss
ATTYS.

Patented July 4, 1950

2,513,318

UNITED STATES PATENT OFFICE 2,513,318

RADIO POSITION FINDING SYSTEM

James E. Hawkins and Beverly W. Koeppel, Tulsa, Okla., assignors to Seismograph Service Corporation, Tulsa, Okla., a corporation of Delaware Application August 5, 1948, Serial No. 42,648

14 Claims. (Cl. 343—105)

The present invention relates to radio position finding systems and more particularly to improvements in radio position finding systems of the hyperbolic, continuous wave type employing phase comparison in pairs of position indication signals radiated from at least three spaced transmitting points to provide indications from which the position of a mobile receiving point relative to the known positions of the transmitting points may be determined.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by isophase lines which are hyperbolic in contour about the transmitting points as foci. On a line bisecting the pair of transmitters, these isophase lines are spaced apart a distance equal to one-half the mean wave length of the radiated waves and have diverging spacings at points on either side of this line. With this system arrangement, the position of a receiving point relative to a pair of hyperbolic isophase lines may be determined by measuring the phase relationship between continuous waves radiated from the pair of transmitters. Since the point of location of the receiving point along the zone separating the two isophase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. Systems of the character described are exceedingly accurate insofar as the position indications produced at the receiving point are concerned. To obtain the desired indication accuracy, however, it is necessary to maintain phase synchronization between the continuous waves radiated by the spaced transmitters, or alternatively, so to arrange the system that phase shifts between the radiated waves are compensated during the phase comparing operation. Phase synchronization of the waves radiated from the plurality of transmitters presents an exceedingly difficult problem which has been the subject of considerable development work. All solutions which have been found for this problem involve the use of relatively elaborate and somewhat delicate instrumentation not well adapted for the continuity of service required in position determining systems. To obviate this problem, systems of the continuous wave hyperbolic type have been proposed (see Honore Patent No. 2,148,267) in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, wnere the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of equiphase lines. While the described arrangement for obviating the phase synchronization problem completely solves this problem, it entails the use of two carrier channels in addition to the three or four channels taken up by the three or four continuously operating survey transmitters, in order to make up a complete system. It is also desirable that the channel frequencies be located adjacent the broadcast band or at least below the ultrahigh frequency band in order to obviate the problem of line-of-sight transmission. This, of course, means location of a number of channel frequencies in the most crowded portion of the frequency spectrum at least insofar as operations in the United States are concerned.

Another troublesome problem encountered in the operation of systems of this character is that of maintaining amplitude equality of the reference signals and heterodyne or beat frequency signals which are detected or developed at the receiving unit and impressed upon the phase metering device for phase comparison and of compensating for, or preventing, any phase shifts which may occur in the input signals in the two branches of the phase meter circuit due to changes in the frequency thereof. One requirement for accurate response of known types of phase comparison meters is that amplitude equality of the two input signals must be rigidly maintained. It has been found, moreover, that the required amplitude equality between the reference signals and the heterodyne or beat frequency signals impressed upon the phase comparison meters in systems of this character cannot be obtained by reliance upon the automatic gain control, or AVC circuits associated with the radio frequency and intermediate frequency sections of the receivers from which the signals are derived. This is particularly true with respect to the heterodyne or beat frequency signals, because of the fact that the amplitude of such a signal depends upon the relative strengths of the two signals which are heterodyned and the further fact that when the two received signals are appreciably unbalanced, the stronger of the received signals dominantly controls the receiver AVC circuit, resulting in the weaker signal being undesirably reduced in strength to thereby accentuate the amplitude departure of the beat frequency output signal from the desired fixed level.

It has likewise been found that minor changes in the frequency of the heterodyne or beat frequency signals, due to slight and otherwise unobjectionable variations in the carrier frequencies employed, will result in a phase shift in one branch of the phase comparing circuit such as to produce an erroneous indication. This is due to the frequency response characteristics of the sharply tuned audio filters employed in the system and may amount to as much as one degree for each cycle of beat frequency change.

It is an object of the present invention, therefore, to provide an improved radio position determining or ranging system of the above character in which the problems of maintaining amplitude equality of the signals to be phase compared, and of compensating for phase shifts caused by variations in the frequency of the signals, are obviated.

It is a further object of the invention to provide improved receiving apparatus which is uniquely adapted for use in a position determining system of the character described.

It is another object of the invention to minimize inequalities of amplitude as between the signals applied to the phase meter of the receiving equipment embodied in the system, thereby to minimize errors of position indication.

It is still another object of the invention to compensate for phase shifts in the signals to be compared, introduced into the phase comparing circuit by changes in the frequency of the signals.

It is a still further object of the invention to provide improved and exceedingly simple wave receiving and translating apparatus uniquely adapted for use in a position determining system of the character indicated and characterized by the maintenance of rigid amplitude equality between the signals which are phase compared to provide the desired position indications.

Although not limited thereto, the present invention is particularly applicable to and is disclosed in connection with radio position determining systems of the type disclosed and claimed in a copending application of James E. Hawkins and Robert S. Finn, Serial No. 778,796 filed October 9, 1947, and assigned to the same assignee as as the present invention. In the system disclosed in this copending application the problem of minimizing the number of frequency channels is solved by so arranging the system that two of the three transmitting units forming a complete system are alternatively employed to radiate the required position indicating and reference signals. More specifically, the two combination position indicating and reference signal transmitters function to radiate pure unmodulated carrier wave energy when functioning to produce position indicating signals and to radiate the same carriers modulated with reference signals when operating as reference signal transmitters and the two receivers at the receiving station alternately receive the two types of signals to produce the equal frequency signals for phase comparison.

Figure 2:
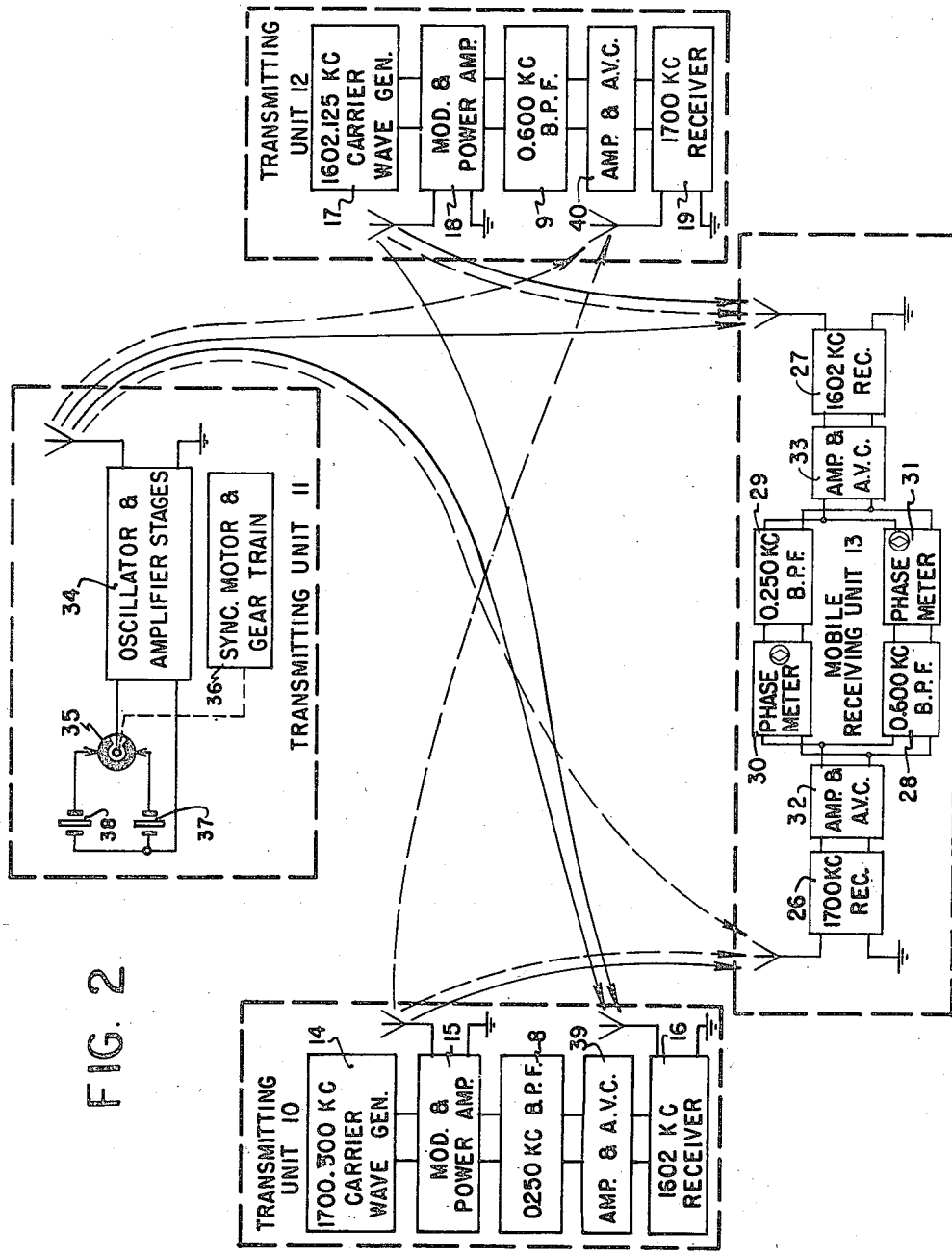

The invention, both as to its organization and method of operation, together with further objects and advantages thereof, will best be understood by reference to the specification taken in connection with the accompanying drawing, in which Fig. 1 diagrammatically illustrates an improved radio position determining system characterized by the features of the present invention, and Fig. 2 illustrates a modified embodiment of the system.

Referring now to the drawings, wherein the same reference characters have been used to identify corresponding components of the two disclosed embodiments of the system, the present invention is illustrated as embodied in a system for providing position information at a mobile receiving unit 13 which may be carried by a vessel or vehicle operating within the radius of transmission of three spaced transmitting units 10, 11, and 12. These units are preferably spaced apart approximately equal distances and are so positioned that the line bisecting the points of location of the units 10 and 11 is angularly related to the line bisecting the points of location of the units 11 and 12. As described more fully below, the transmitting units 10 and 12 are equipped continuously to radiate position indicating signals in the form of carrier waves of different frequencies, whereas the transmitting unit 11 is equipped alternately to radiate two additional position indicating signals in the form of carrier waves of still different frequencies. Specifically, the transmitter embodied in the unit 10 comprises a carrier wave generator or oscillator 14 and a modulator and power amplifier unit 15. Similarly, the transmitter embodied in the transmitting unit 12 comprises a carrier wave oscillator or generator 17 and a modulator and power amplifier unit 18. The transmitting unit 11 comprises two transmitters 20 and 21 for respectively radiating position indicating carrier waves at two different carrier frequencies, together with switching means for alternately rendering these two transmitters operative. In the arrangement illustrated, keying of the two transmitters 20 and 21 for alternate operation is accomplished by alternately feeding anode current to the electron discharge tubes of the respective transmitters from the positive terminal 25 of the anode current source, not shown, through a commutating ring 22 which is shaft connected by means of a shaft 24 to be driven at a constant speed by a synchronous motor and gear train unit 23. More specifically, the positive terminal 25 of the anode current source is connected to the conductive segment 22b of the commutating ring 22, which segment spans slightly less than half the circumference of the ring. The remainder of the ring is comprised of an insulating segment 22a. At diametrically opposed points around the circumference of the ring, brushes 22c and 22d are provided which engage the ring periphery. These brushes are respectively connected to the positive bus conductors of the two transmitters 20 and 21, such that anode current is alternately delivered to the electron discharge tubes of the two transmitters. Since the conductive segment 22b of the ring 22 represents slightly less than half the peripheral surface of the ring, it will be understood that a short off-signal period is provided between successive periods during which the transmitters 20 and 21 are alternatively operated, thus preventing simultaneous radiation of waves by both transmitters. The periodicity with which the two transmitters 20 and 21 are alternately operated is, of course, dependent upon the speed of rotation of the commutating ring 22. Preferably, this ring is driven at a speed of one revolution per second such that the transmitters 20 and 21 are each rendered operative at one-half second intervals.

While the transmitting unit 11 has been illustrated as comprising two transmitters 20 and 21, it will be understood that if desired a single transmitter may be employed which is equipped with two carrier wave frequency determining elements (crystals) or tank circuits having different resonant frequencies. In such case, the anodes of the tubes embodied in the transmitter may be continuously supplied with operating potentials in the usual manner, and the switching device comprising the commutating ring 22 may be employed alternately to connect the two frequency determining elements or circuits into the transmitter circuit to control the output frequency of the transmitter. An arrangement of this character is schematically illustrated in Fig. 2 of the drawings, wherein the two frequency determining crystals 37 and 38 having natural resonant frequencies of 1601.875 and 1699.700 kilocycles, respectively, are alternately connected to determine the output frequency of the oscillator and amplifier stages 34 of the transmitter by means of the commutating ring 35 which is driven by a synchronous motor and gear train unit 36. This arrangement has the advantage of minimizing duplication of equipment.

As indicated above, the carrier frequencies at which the four transmitters of the three transmitting units 10, 11 and 12 operate are all different. Preferably, however, these carrier waves are so paired that the frequencies of each pair are well within a single channel allocation of 10 kilocycles as specified by the Federal Communications Commission of the United States Government. To this end, the output frequency of the transmitter 20 and the output frequency of the transmitter in the unit 12, forming the first transmitter pair, may be 1601.875 and 1602.125 kilocycles, respectively, such that the difference frequency therebetween is 0.250 kilocycle, while the output frequencies of the transmitter 21 and the transmitter of the unit 10, forming the second transmitter pair, may be 1699.700 and 1700.300 kilocycles, respectively, such that the difference frequency therebetween is 0.600 kilocycle. It will be noted that the channels in which the two pairs of carrier frequencies fall are separated in the frequency spectrum by approximately 100 kilocycles, thus facilitating selective reception of these carrier pairs in the manner more fully explained below. The power of the four transmitters is such that the entire area in which position information may be desired aboard the vehicle or vessel carrying the receiving unit 13 is blanketed with waves radiated from each of the four transmitters and that these waves have a field strength at all points within this area sufficient to permit reliable reception without requiring undue sensitivity of the receiving equipment.

In order to obviate the above-mentioned difficulties attendant with phase synchronization of the position indication carrier waves radiated by the four transmitters, while at the same time eliminating the necessity for utilizing additional frequency channels, means are provided in the transmitting units 10 and 12 for alternately modulating the waves radiated by the transmitters of the units 10 and 12 with reference signals representative of the difference frequencies between the carrier wave pairs. These reference signals may be received at any receiving point, such, for example, as at the mobile receiving unit 13, located within the radius of transmission of the four transmitters. The equipment for this purpose as provided at the transmitting unit 10 comprises a fixed tuned amplitude modulation receiver 16, center tuned to a frequency of 1602 kilocycles and sharply selective to the 1601.875 and 1602.125 kilocycle carrier waves respectively radiated by the transmitter 20 and the transmitter 20 and the transmitter of the unit 12. The selectivity of this receiver is obviously such that the carrier waves radiated by the transmitter 21 and the transmitter of the unit 10 are rejected in the radio frequency section thereof. The beat frequency of 0.250 kilocycle between the two carriers accepted by the radio frequency section of the receiver 16 is reproduced in the audio frequency section of this receiver and delivered to the modulator 15 for amplitude modulation upon the carrier output of the transmitter embodied in the unit 10 through a narrow band pass filter 8, which is center tuned to a frequency of 0.250 kilocycles. Similarly, the transmitting unit 12 is equipped with a fixed tuned amplitude modulation receiver 19 which is tuned to a carrier frequency of 1700 kilocycles and is sharply selective to the 1699.700 and 1700.300 kilocycle waves respectively radiated by the transmitter 21 and the transmitter of the unit 10. Here again, the selectivity of the receiver 19 is obviously such that the carrier waves radiated by the transmitter 20 and the transmitter of the unit 12 are rejected in the radio frequency section of the receiver. The beat frequency of 0.600 kilocycle between the two carrier waves accepted by the receiver 19 is reproduced in the audio frequency section thereof and modulated upon the carrier wave output of the transmitter embodied in the transmitting unit 12 through a narrow band pass filter 9 which is center tuned to a frequency of 0.600 kilocycles.

Referring now more particularly to the equipment making up the mobile receiving unit 13, it is pointed out that this equipment comprises a pair of fixed tuned amplitude modulation receivers 26 and 27 the output circuits of which are respectively connected through suitable amplifier and automatic gain or volume control stages 32 and 33 to a pair of phase angle meters 30 and 31 and a pair of narrow band pass filters 28 and 29 center tuned respectively to frequencies of 0.600 and 0.250 kilocycle. More specifically, the receiver 26 is fixed tuned to a carrier frequency of 1700 kilocycles and is designed to accept the carrier wave radiated by the transmitter 21 and the carrier wave radiated by the transmitter of the unit 10 both when the latter is modulated and unmodulated. Similarly, the receiver 27 is fixed tuned to a carrier frequency of 1602 kilocycles and is designed to accept the carrier wave radiated by the transmitter 20 and the carrier wave radiated by the transmitter of the unit 12 both when the latter is modulated and unmodulated.

In accordance with the present invention, the automatic gain control or AVC circuits associated with the amplifier stages 32 and 33 are of the variable impedance type known in the art and capable of functioning without introducing amplitude distortion or variable phase shift in the reference signals and the heterodyne or difference frequency signals developed at the output terminals of the receivers. Preferably the amplifier and AVC stages are of the type disclosed in a copending application of James E. Hawkins and Jesse R. Cornett, Serial No. 673,744, filed June 1, 1946, for Seismic Signal Amplifier and assigned to the same assignee as the present invention and each of these stages corresponds to the automatic gain control and amplifier stage identified by the reference number 13 in the said Hawkins and Cornett application.

The filters 28 and 29, which may be of any standard commercial construction, perform the function of selecting the heterodyne or difference frequency signals alternately developed at the output terminals of the receivers 26 and 27, respectively, and delivering these signals to the phase meters 31 and 30, respectively. Preferably these meters are of the general character disclosed in Patent No. 1,762,725—Marrison, granted June 10, 1930, and are capable of measuring phase angles in excess of 360 electrical degrees between two impressed signal voltages. Each phase meter is equipped with a rotatable rotor carrying a pointer which indexes with a circular scale to indicate the phase relationship between the two impressed voltages. If desired, each meter may also be equipped with a revolution counter, gear driven from the rotor element of the meter to count the isophase lines traversed by the mobile receiving unit 13.

In considering the operation of the above-described position determining system, it will be understood that when the motor and gear train unit 23 is operating to drive the commutating ring 22, anode current is alternately delivered to the electron discharge tubes of the transmitters 20 and 21, such that these transmitters are alternately rendered operative to radiate carrier waves at frequencies of 1601.875 and 1699.700 kilocycles, respectively. The transmitters of the units 10 and 12, on the other hand, operate continuously. Accordingly, during each interval when the transmitter 20 is in operation, the carrier waves of 1601.875 and 1602.125 kilocycles respectively radiated by the transmitter 20 and the transmitter of the unit 12 are picked up and heterodyned in the radio frequency sections of the receivers 16 and 27. In the receiver 16, the difference frequency signal of 0.250 kilocycle is reproduced in the audio section of the receiver, passed by the filter 8, and modulated upon the carrier wave output of the transmitter in the unit 10 for radiation as a reference signal. If desired an amplifier and automatic gain control stage 39 identical with the stages 32 and 33 may be interposed in the output circuit of the receiver 16 in the manner illustrated in Fig. 2 of the drawings in order to maintain constant modulation. This modulated carrier wave is received by the receiver 26 of the mobile receiving unit 13 and the 0.250 kilocycle modulation component is reproduced at the output terminals of the receiver. During the period indicated, the transmitter 21 is not in operation and hence no heterodyne or beat frequency signal is developed by the receiver 26. The 0.250 kilocycle reference signal as thus reproduced by the receiver 26 is amplified to the proper level in the amplifier and AVC stage 32 and applied to the left set of input terminals of the phase meter 30 and also to the input terminals of the 0.600 kilocycle band pass filter 28. This filter rejects the applied signal and thus prevents the same from being applied to the left set of input terminals of the phase meter 31.

The 0.250 kilocycle beat frequency or heterodyne signal resulting from heterodyning of the carriers radiated by the transmitter 20 and the transmitter of the unit 12 in the radio frequency section of the receiver 27 is reproduced across the output terminals of this receiver and after amplification to the proper level in the amplifier and AVC stage 33 is applied to the right set of terminals of the phase meter 31 and the input terminals of the 0.250 kilocycle band pass filter 29 in parallel. Since the filter 28 prevents a signal from being applied to the left set of input terminals of the phase meter 31, this phase meter does not respond to the signal voltage applied to its right set of input terminals by the receiver 27. The filter 29, however, passes the signal developed across the output terminals of the amplifier and AVC stage 27 and applies the same to the right set of input terminals of the phase meter 30. Thus two signal voltages of identical frequency and equal amplitude are applied to the two sets of input terminals of the phase meter 30, with the result that this phase meter functions accurately to measure the phase angle therebetween. This phase angle indication is accurately representative of the position of the receiving unit 13 between two isophase lines of the standing waves produced in space as a result of the carrier wave radiation by the transmitter 20 and the transmitter of the unit 12.

It will be observed that, during the above described operation, the 0.250 kilocycle reference signal is applied to the left set of input terminals of the phase meter 30 directly from the amplifier and AVC stage 32, while the 0.250 beat frequency signal applied to the right set of input terminals from the amplifier and AVC stage 33 passes through the filter 29. Accordingly the two branches of the phase meter circuit are unbalanced and minor changes in the signal frequency, say for example from 0.250 kilocycle to 0.249 or 0.251 kilocycle, will result in a phase shift in the right hand branch of the phase meter circuit due to the phase shift characteristics of the filter 29 thereby causing the phase meter 30 to give an erroneous indication. In accordance with the present invention, however, such erroneous indications are prevented by the provision in the system of means for automatically compensating the undesirable phase shift produced in the filter 29. The compensating means may take the form of a suitable frequency responsive phase shifting network incorporated in the left hand branch of the input circuit of the phase meter 30 between the meter and the amplifier and AVC stage 32. However, it is preferable to effect the desired compensation without requiring additional equipment and this may be accomplished by employing in the transmitting unit 10 a 0.250 kilocycle band pass filter 8 identical with the filter 29 and by adjusting the filters 8 and 29 to have identical phase shift characteristics.

As heretofore explained, the 0.250 kilocycle reference signal applied to the left set of input terminals of the phase meter 30 is delivered to the modulator 15 of the unit 10 through the filter 8. Accordingly, any variation in the frequency of this beat note signal, will cause a phase shift in the signal identical to the phase shift produced in the filter 29 and erroneous indications of the phase meter 30 are thus avoided.

At the end of the described transmitting interval, the commutating ring 22 functions to interrupt the circuit for delivering anode current to the tubes of the transmitter 20, with the result that carrier wave radiation from this transmitter is terminated. When radiation of this wave stops, the carrier heterodyning action of the two receivers 16 and 27 is likewise terminated to interrupt the reference signal radiation by the transmitter of the unit 10 and to interrupt the heterodyne or difference frequency signal being developed across the output terminals of the receiver 27. Thus the phase meter 30 is rendered ineffective further to change the setting of its indicating element.

A short time interval after operation of the transmitter 20 is stopped, the commutating ring 22 functions to deliver anode current to the tubes of the transmitter 21 and thus initiate operation of this transmitter. With the transmitter 21 in operation, a 1699.700 kilocycle position indicating carrier wave is radiated thereby which is accepted by the receivers 19 and 26. More specifically, the receiver 19 functions to heterodyne the carrier wave radiated by the transmitter 21 with the carrier wave radiated by the transmitter of the unit 10 and to reproduce the heterodyne or difference frequency signal of 0.600 kilocycle in the audio frequency section thereof. This difference frequency or reference signal is passed by the filter 9, modulated upon the output carrier wave of the generator 17 in the modulator and power amplifier unit 18 and radiated as a modulation component upon the carrier wave transmitted by the transmitter of the unit 12 to the receiver 27. As previously mentioned in connection with the receiver 16 of unit 10, a suitable amplifier and automatic gain control stage 40 may be interposed in the output circuit of the receiver 19 in the manner illustrated in Fig. 2 of the drawings in order to maintain constant modulation. The receiver 27 accepts the modulated carrier wave and reproduces the modulation component thereof in the usual manner. The reference signal thus developed across the output terminals of the receiver 27 is amplified to the proper level in the amplifier and AVC stage 33 and applied across the right set of input terminals of the phase meter 31 and the input terminals of the band pass filter 29 in parallel. This filter functions to reject the applied reference signal voltage and thus prevent the same from being impressed across the right set of input terminals of the phase meter 30. It will be understood that the receiver 27 is incapable of accepting the carrier wave radiated by the transmitter of the unit 10. Hence this receiver is prevented from heterodyning the carrier wave radiated by the transmitter of the unit 10 with the carrier wave radiated by the transmitter of the unit 12.

The 1699.700 and 1700.300 kilocycle waves respectively radiated by the transmitter 21 and the transmitter of the unit 10 are both accepted by the receiver 26 and heterodyned in the radio frequency section thereof to produce a heterodyne or difference frequency signal which is produced across the output terminals of the receiver and, after amplification to the proper level in the amplifier and AVC stage 32, is applied to the left set of input terminals of the phase meter 30 and the input terminals of the filter 28 in parallel. Since no signal voltage is applied to the right set of terminals of the phase meter 30 when the transmitter 21 is operating, this phase meter remains inactive. The reference signal of 0.600 kilocycle applied to the input terminals of the filter 28 is passed by this filter and applied to the left set of input terminals of the phase meter 31. Thus reference and heterodyne or difference frequency signals of identical frequencies and equal amplitudes are respectively applied to the two sets of input terminals of the phase meter 31. This phase meter functions to measure the phase relationship between the two applied signal voltages of equal amplitude and thus provide an indication accurately repreesntative of the position of the receiving unit 13 between two isophase lines of the standing waves produced in space by the radiation of position indicating carrier waves from the transmitter 21 and the transmitter of the unit 10.

As previously described in connection with the circuits for the phase meter 30, the input circuits to the phase meter 31 are unbalanced in that the left hand branch includes the 0.600 kilocycle filter 28 which may cause an undesirable phase shift in response to minor variations in the signal frequency, and accordingly the filter 28 should be identical with the 0.600 kilocycle filter 9 in the unit 12, the two filters being adjusted to have identical phase shift characteristics in order to eliminate erroneous indications of the phase meter 31 due to changes in the frequency of the 0.600 kilocycle reference and heterodyne signals.

At the end of the described transmitting interval, the commutating ring 22 functions to interrupt anode current flow to the tubes of the transmitter 21 and thus arrest operation of this transmitter. When carrier wave radiation by the transmitter 21 is thus terminated, the wave heterodyning action effect in the receivers 19 and 26 is instantly stopped to terminate the radiation of 0.600 kilocycle reference signal by the transmitter of the unit 12 and to terminate reproduction of the difference or heterodyne signal at the output terminals of the receiver 26. Thus the application of signal voltages to the two sets of input terminals of the phase meter 31 is interrupted, with the result that no further change in the setting of the element of this meter can be produced. A short time interval after operation of the transmitter 21 is arrested, the commutating ring 22 functions to recomplete the circuit for delivering anode current to the tubes of the transmitter 20 and thus reinitiate operation of this transmitter with the results described above.

From the foregoing explanation, it will be understood that the transmitters 20 and 21, in their alternate operation to radiate position indicating carrier waves, cooperate with the receivers 16 and 19 of the transmitting units 10 and 12 alternately to render the transmitters of these latter units operative to radiate position indicating signals and reference signals. More in particular, the position indicating carrier waves alternately radiated by the transmitters 20 and 21 alternately cause the position indicating carrier waves respectively radiated by the transmitters of the units 10 and 12 to be modulated with reference signals during periods when these latter transmitters are respectively inactive as position indicating signal radiators. At the receiver equipment the receivers 26 and 27 alternately detect and develop reference signals and position indicating signals which are amplified to the proper equal level in the stages 32 and 33 and supplied to the phase meters 30 and 31.

In order to illustrate the action which occurs, arrow pointed solid lines have been shown in Fig. 1 of the drawings to indicate the receiving points of signal acceptance and the sources of the accepted signals during each period when the transmitter 20 is operating, and arrow pointed dashed lines have been shown to illustrate the receiving points of signal acceptance and the sources of accepted signals during each period when the transmitter 21 is operating. From a consideration of these lines and reflection upon the above explanation, it will be understood that the receivers 26 and 27 alternately function as reference signal detecting receivers and as heterodyning receivers for developing the required heterodyne or difference frequency signals. Specifically, the receiver 26 functions as a heterodyne receiver in respect to the position indicating carrier waves radiated by the transmitter 21 and the transmitter of the unit 10, and functions as a reference signal reproducing receiver in receiving the reference signal modulated carrier radiated by the transmitter of the unit 10. The receiver 27, on the other hand, functions as a heterodyne receiver in respect to the position indicating carrier waves radiated by the transmitter 20 and the transmitter of the unit 12 and as a reference signal detecting receiver in receiving the reference signal modulated carrier wave radiated by the transmitter of the unit 12.

As will be evident from the above explanation, the phase meter 30 functions to produce a phase angle indication which is representative of the position of the receiving unit 13 between two isophase lines of the standing waves produced in space as a result of carrier wave radiation by the transmitter 20 and the transmitter of the unit 12. With the described arrangement, wherein carrier wave frequencies of 1601.875 and 1602.125 kilocycles are employed, the wave length spacing between the isophase lines along a line bisecting the units 11 and 12 is determined by the mean frequency of 1602 kilocycles between the two radiated carrier waves. At this particular mean frequency, isophase lines representative of the same phase relationship between the standing waves produced by the transmitter 20 and the transmitter of the unit 12 along the line joining the unit 20 and the unit 12 are spaced apart a distance of about 307 feet. Hence the indication provided by the phase meter 30 identifies the position of the receiving unit 13 within a zone not less than 307 feet in width, i. e., a zone having a minimum width equal to one half the wave length of a wave having a frequency equal to the mean frequency of the position indicating carrier waves radiated by the transmitter 20 and the transmitter of the unit 12.

As previously indicated, the indication provided by the phase meter 30, standing alone, is ambiguous for the reason that this indication does not identify the point of location of the receiving unit 13 along the zone separating the two adjacent isophase lines of the standing waves produced in space by the transmitter 20 and the transmitter of the unit 12. Identification of this point is obtained through the response of the receiving unit to the position indicating signals radiated by the transmitter 21 and the transmitter of the unit 10. Thus, the phase meter 31 provides an indication of the position of the receiving point, namely, the unit 13, between two isophase lines of the standing waves produced in space by the radiation of position indicating carrier waves from the transmitter 21 and the transmitter of the unit 10. Here again, the wave length spacing of isophase lines along the line bisecting the two units 10 and 11 is determined by the mean frequency of 1700 kilocycles between the frequencies of the waves radiated by the transmitter 21 and the transmitter of the unit 10. At this particular mean frequency, isophase lines representative of the same phase relationship between the standing waves produced by the two identified transmitters have a minimum spacing of approximately 289 feet, such that the indication provided by the meter 31 identifies the position of the receiving unit 13 within a zone having a 289 foot minimum width. The two indications thus provided by the phase meters 30 and 31 may readily be resolved into distance indications from which the position of the receiving point relative to the two transmitting units 10 and 12 may be determined. With these distances known and the positions of the transmitting units 10, 11 and 12 known, the position of the receiving point may obviously be easily determined.

From the preceding explanation it will be apparent that the two amplifiers and automatic gain control units 32 and 33 respond directly to the two pairs of signals to be phase compared to establish amplitude equality between the signals of each pair.

Thus regardless of any ineffectiveness of the automatic gain control facilities controlling the radio frequency sections of the receivers 16, 19, 26 and 27 in maintaining amplitude constancy of the signals reproduced by these receivers, amplitude equality of the signals impressed upon the two sets of input terminals of the phase meters 30 and 31 is insured. As a consequence, errors of indication caused by amplitude inequality of the phase compared signals are eliminated. Moreover, by employing amplifier and gain control units 32 and 33 of the improved character disclosed and claimed in the above referred to copending application Serial No. 673,744, the desired end of establishing compared signals is realized without producing amplitude distortion or variable phase shift of the phase compared signals.

It will be likewise apparent from the above explanation that erroneous indications of the phase meters 30 and 31 due to minor changes in the frequency of the 0.250 kilocycle and 0.600 kilocycle signals are eliminated by proper selection and adjustment of the 0.250 kilocycle filters 8 and 29 in the transmitting unit 10 and the receiving unit 13, respectively, and by proper selection and adjustment of the 0.600 kilocycle filters 9 and 28 in the transmitting unit 12 and the receiving unit 13, respectively. Moreover, suitable phase shifting networks may be incorporated in the input circuits of the phase meters 30 and 31 to eliminate such erroneous indications in the event that the employment of identical and equally adjusted filters in the transmitting and receiving units is impracticable or inadvisable.

While a particular embodiment of the invention has been shown, it will be understood, of course, that the invention is not to be limited thereto, since many modifications may be made, and it is contemplated, therefore, by the appended claims, to cover any such modifications as fall within the true spirit and scope of the invention.

What is claimed and desired to be secured by Letters Patent of the United States is:

1. Wave signal receiving apparatus for translating received space radiated waves into position indications, comprising a receiver operative to receive a first pair of space radiated waves and to heterodyne said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver operative to receive and heterodyne said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, phase measuring means excited by said signals in pairs and operative to measure the phase relationship between said first heterodyne and second reference signals and between said second heterodyne and first reference signals to provide two indications of the position of said receiving system relative to two displaced sources of said waves, and signal responsive-signal level control means for maintaining substantial amplitude equality between the signals exciting said phase measuring means.

2. Wave signal receiving apparatus for translating received space radiated waves into position indications, comprising a receiver operative to receive a first pair of space radiated waves and to heterodyne said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver operative to receive and heterodyne said pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, phase measuring means excited by said signals in pairs and operative to measure the phase relationship between said first heterodyne and second reference signals and between said second heterodyne and first reference signals to provide two indications of the position of said receiving system relative to two displaced sources of said waves, and signal responsive-signal level control means for transmitting said signals from said receivers to said phase measuring means and for maintaining substantial amplitude equality between the signals exciting said phase measuring means.

3. Wave signal receiving apparatus for translating received space radiated waves into position indications, comprising a receiver operative to receive a first pair of space radiated waves and to heterodyne said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver operative to receive and heterodyne said second pair of radiated waves to produce a second heterodyne signal having a frequency equaling the frequency of said first reference signal, said second receiver being alternately operative to receive and reproduce a second reference signal having a frquency representative of the difference frequency between said first pair of waves and modulated upon one of said second pair of waves, phase measuring means excited by said signals in pairs and operative to measure the phase relationship between said first heterodyne and second reference signals and between said second heterodyne and first reference signals to provide two indications of the position of said receiving system relative to two displaced sources of said waves, signal responsive-signal level control means for maintaining substantial amplitude equality between the signals exciting said phase measuring means, and means comprising filters coupled between said receivers and said phase measuring means and tuned respectively to said heterodyne signals for selectively rendering said phase measuring means operative to measure the phase relationship between different pairs of said signals.

4. Wave signal receiving apparatus for translating received space radiated waves into position indications, comprising a receiver operative to receive a first pair of space radiated waves and to heterodyne said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver operative to receive and heterodyne said second pair of radiated waves to produce a second heterodyne signal having a frequency equaling the frequency of said first reference signal, said record receiver being alternately operative to receive and reproduce a second reference signal having a frequency representative of the difference frequency between said first pair of waves and modulated upon one of said second pair of waves, phase measuring means excited by said signals in pairs and operative to measure the phase relationship between said first heterodyne and second reference signals and between said second heterodyne and first reference signals to provide two indications of the position of said receiving system relative to two displaced sources of said waves, signal responsive-signal level control units coupled to the output sides of said receivers and operative to maintain substantial amplitude equality between the signals exciting said phase measuring means, and filters connected between said units and said phase measuring means and tuned respectively to said heterodyne signals for selectively passing said heterodyne signals to said phase measuring means.

5. Wave signal receiving apparatus for translating received space radiated waves into position indications, comprising a receiver operative to receive a first pair of space radiated waves and to heterodyne said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver operative to receive and heterodyne said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, a first phase measuring device for measuring the phase relationship between said first heterodyne signal and said second reference signal to provide an indication of the position of said apparatus relative to the source of one of said waves, a second phase measuring device for measuring the phase relationship between said second heterodyne signal and said first reference signal to provide an indication of the position of said apparatus relative to the source of a second of said waves, signal responsive-signal level control units coupled to the output sides of said receivers and operative to maintain substantial amplitude equality between the signals exciting said phase measuring devices, and filters connected between said units and said phase measuring devices and tuned respectively to said heterodyne signals for selectively rendering said phase measuring devices operative to measure the phase relationship between said signals.

6. In a position determining system, a receiving point, a pair of spaced transmitters continuously operative to radiate distinguishable position indicating signals, a transmitting unit spaced from each of said transmitters and including means for alternately radiating two other distinguishable position indicating signals, heterodyning receivers respectively associated with said transmitters and each jointly responsive to the position indicating signal radiated by the other transmitter and to a different one of the signals radiated by said transmitting unit for alternately modulating the signals radiated by said transmitters with reference signals having frequencies respectively equaling the difference frequencies of the heterodyned signals, a pair of receivers at said receiving point each operative to receive and reproduce a different one of said reference signals, said last-named receivers also being alternately operative to heterodyne the position indicating signals which have a difference frequency equaling the frequency of the reference signal being reproduced by the other receiver of said pair and to reproduce such difference frequency signal, whereby two pairs of signals of matching frequencies are alternately developed at said receiving point, phase measuring means at said receiving point for measuring the phase relationship between the signals of each pair, thereby alternately to produce indications representative of the position of said receiving point relative to different ones of said transmitters, and signal responsive-signal level control means for maintaining substantial amplitude equality of the signals impressed upon said phase measuring means.

7. In a position determining system, a receiving point, a pair of spaced transmitters continuously operative to radiate distinguishable position indicating signals, a transmitting unit spaced from each of said transmitters and including means for alternately radiating two other distinguishable position indicating signals, heterodyning receivers respectively associated with said transmitters and each jointly responsive to the position indicating signal radiated by the other transmitter and to a different one of the signals radiated by said transmitting unit for alternately modulating the signals radiated by said transmitters with reference signals having frequencies respectively equaling the difference frequencies of the heterodyned signals, a pair of receivers at said receiving point each operative to receive and reproduce a different one of said reference signals, said last-named receivers also being alternately operative to heterodyne the position indicating signals which have a difference frequency equaling the frequency of the reference signal being reproduced by the other receiver of said pair and to reproduce the difference frequency signal, whereby two pairs of signals of matching frequencies are alternately developed at said receiving point, phase measuring means at said receiving point for measuring the phase relationship between the signals of each pair, thereby alternately to produce indications representative of the position of said receiving point relative to different ones of said transmitters, and signal responsive-signal level control means connected between each of said receivers of said pair and said phase measuring means for maintaining substantial amplitude equality of the signals impressed upon said phase measuring means.

8. In a position determining system, a receiving point, a pair of spaced transmitters continuously operative to radiate distinguishable position indicating signals, a transmitting unit spaced from each of said transmitters and including means for alternately radiating two other distinguishable position indicating signals, heterodyning receivers respectively associated with said transmitters and each jointly responsive to the position indicating signal radiated by the other transmitter and to a different one of the signals radiated by said transmitting unit for alternately modulating the signals radiated by said transmitters with reference signals having frequencies respectively equaling the difference frequencies of the heterodyned signals, a pair of receivers at said receiving point each operative to receive and reproduce a different one of said reference signals, said last-named receivers also being alternately operative to heterodyne the position indicating signals which have a difference frequency equaling the frequency of the reference signal being reproduced by the other receiver of said pair and to reproduce such difference frequency signal, whereby two pairs of signals of matching frequencies are alternately developed at said receiving point, phase measuring means at said receiving point for measuring the phase relationship between the signals of each pair, thereby alternately to produce indications representative of the position of said receiving point relative to different ones of said transmitters, means comprising filters coupled between said pair of receivers at said receiving point and said phase measuring means and tuned respectively to said two pairs of signals for selectively rendering said phase measuring means operative to measure the phase relationship between different pairs of said signals, and phase shifting means for causing a phase shift in one signal of each pair in response to changes in the frequency of such pair to compensate for the phase shift caused by said filters in the other signal of each pair.

9. In a position determining system, a receiving point, a pair of spaced transmitters continuously operative to radiate distinguishable position indicating signals, a transmitting unit spaced from each of said transmitters and including means for alternately radiating two other distinguishable position indicating signals, heterodyning receivers respectively associated with said transmitters and each jointly responsive to the position indicating signal radiated by the other transmitter and to a different one of the signals radiated by said transmitting unit for alternately modulating the signals radiated by said transmitters with reference signals having frequencies respectively equaling the difference frequencies of the heterodyned signals, a pair of receivers at said receiving point each operative to receive and reproduce a different one of said reference signals, said last-named receivers also being alternately operative to heterodyne the position indicating signals which have a difference frequency equaling the frequency of the reference signal being reproduced by the other receiver of said pair and to reproduce such difference frequency signal, whereby two pairs of signals of matching frequencies are alternately developed at said receiving point, phase measuring means at said receiving point for measuring the phase relationship between the signals of each pair, thereby alternately to produce indications representative of the position of said receiving point relative to different ones of said transmitters, means comprising filters coupled between said pair of receivers at said receiving point and said phase measuring means and tuned respectively to said two pairs of signals for selectively rendering said phase measuring means operative to measure the phase relationship between different pairs of said signals, and means for causing a phase shift in one signal of each pair in response to changes in the frequency of such pair to compensate for the phase shift caused by said filters in the other signal of each pair, said last mentioned means comprising filters associated with said heterodyning receivers at said transmiters and respectively tuned to said two pairs of signals and adjusted to provide phase shift characteristics identical to the phase shift characteristic of the correspondingly tuned filter at said receiving point.

10. In a position determining system, a receiving point, a pair of spaced transmitters continuously operative to radiate distinguishable position indicating signals, a transmitting unit spaced from each of said transmitters and including means for alternately radiating two other distinguishable position indicating signals, heterodyning receivers respectively associated with said transmitters and each jointly reponsive to the position indicating signal radiated by the other transmitter and to a different one of the signals radiated by said transmitting unit for alternately modulating the signals radiated by said transmitters with reference signals having frequencies respectively equaling the difference frequencies of the heterodyned signals, a pair of receivers at said receiving point each operative to receive and reproduce a different one of said reference signals, said last-named receivers also being alternately operative to heterodyne the position indicating signals which have a difference frequency equaling the frequency of the reference signal being reproduced by the other receiver of said pair and to reproduce such difference frequency signal, whereby two pairs of signals of matching frequencies are alternately developed at said receiving point, phase measuring means at said receiving point for measuring the phase relationship between the signals of each pair, thereby alternately to produce indications representative of the position of said receiving point relative to different one of said transmitters, means comprising filters coupled between said pair of receivers at said receiving point and said phase measuring means and tuned respectively to said two pairs of signals for selectively rendering said phase measuring means operative to measure the phase relationship between different pairs of said signals, phase shifting means for causing a phase shift in one signal of each pair in response to changes in the frequency of such pair to compensate for the phase shift caused by said filters in the other signal of each pair, and signal responsive-signal level control means for maintaining substantial amplitude equality of the signals impressed upon said phase measuring means.

11. In a position determining system, a receiving point, a pair of spaced transmitters continuously operative to radiate distinguishable position indicating signals, a transmitting unit spaced from each of said transmitters and including means for alternately radiating two other distinguishable position indicating signals, heterodyning receivers respectively associated with said transmitters and each jointly responsive to the position indicating signal radiated by the other transmitter and to a different one of the signals radiated by said transmitting unit for alternately modulating the signals radiated by said transmitters with reference signals having frequencies respectively equaling the difference frequencies of the heterodyned signals, a pair of receivers at said receiving point each operative to receive and reproduce a different one of said reference signals, said last-named receivers also being alternately operative to heterodyne the position indicating signals which have a difference frequency equaling the frequency of the reference signal being reproduced by the other receiver of said pair and to reproduce such difference frequency signal, whereby two pairs of signals of matching frequencies are alternately developed at said receiving point, phase measuring means at said receiving point for measuring the phase relationship between the signals of each pair, thereby alternately to produce indications representative of the position of said receiving point relative to different one of said transmitters, means comprising filters coupled between said pair of receivers at said receiving point and said phase measuring means and tuned respectively to said two pairs of signals for selectively rendering said phase measuring means operative to measure the phase relationship between different pairs of said signals, means for causing a phase shift in one signal of each pair in response to changes in the frequency of such pair to compensate for the phase shift caused by said filters in the other signal of each pair, said last mentioned means comprising filters associated with said heterodyning receivers at said transmitters and respectively tuned to said two pairs of signals and adjusted to provide phase shift characteristics identical to the phase shift characteristic of the correspondingly tuned filter at said receiving point, and signal responsive-signal level control means for maintaining substantial amplitude equality of the signals impressed upon said phase measuring means.

12. In a position determining system, a receiving point, a pair of spaced transmitters continuously operative to radiate distinguishable position indicating signals, a transmitting unit spaced from each of said transmitters and including means for alternately radiating two other distinguishable position indicating signals, heterodyning receivers respectively associated with said transmitters and each jointly responsive to the position indicating signal radiated by the other transmitter and to a different one of the signals radiated by said transmitting unit for alternately modulating the signals radiated by said transmitters with reference signals having frequencies respectively equaling the difference frequencies of the heterodyned signals, signal responsive-signal level control means for controlling the amplitudes of said reference signals to maintain the signal modulation levels of said transmitters substantially constant, a pair of receivers at said receiving point each operative to receive and reproduce a different one of said reference signals, said last-named receivers also being alternately operative to heterodyne the position indicating signals which have a difference frequency equaling the frequency of the reference signal being reproduced by the other receiver of said pair and to reproduce the difference frequency signal, whereby two pairs of signals of matching frequencies are alternately developed at said receiving point, phase measuring means at said receiving point for measuring the phase relationship between the signals of each pair, thereby alternately to produce indications representative of the position of said receiving point relative to different ones of said transmitters, and signal responsive-signal level control means connected between each of said receivers of said pair and said phase measuring means for maintaining substantial amplitude equality of the signals impressed upon said phase measuring means.

13. A wave signal transmission system for radiating position indicating signals, comprising two spaced transmitters for radiating waves at different frequencies, a transmitting unit spaced from each of said pair of transmitters and including means for alternately radiating waves at two still different frequencies, heterodyning receivers individually responsive to different ones of the waves radiated by said transmitting unit for alternately modulating the waves radiated by said two transmitters with reference signals, and signal responsive-signal level control means for controlling the amplitudes of said reference signals to maintain the signal modulation levels of said transmitters substantially constant.

14. In a wave signal transmission system for radiating position indicating signals, a plurality of transmitters, receiving means for heterodyning signals received from two of said transmitters and for modulating the output of a third of said transmitters with a reference signal related in frequency to a beat frequency of the heterodyned signals, and signal responsive-signal level control means for controlling the amplitude of said reference signal to maintain the signal modulation level of said third transmitter substantially constant.

JAMES E. HAWKINS.
BEVERLY W. KOEPPEL.

REFERENCES CITED

The following references are of record in the file of this patent:

UNITED STATES PATENTS

| Number | Name | Date |
| --- | --- | --- |
| 2,148,267 | Honore | Feb. 21, 1939 |
| 2,430,244 | O'Brien | Nov. 4, 1947 |
| 2,483,557 | O'Brien | Oct. 4, 1949 |
| 2,500,200 | O'Brien | Mar. 14, 1950 |